(12) United States Patent
Thoelmann et al.

(10) Patent No.: US 9,893,388 B2
(45) Date of Patent: Feb. 13, 2018

(54) METHOD FOR ACTIVATING A PLURALITY OF MONITORING UNITS FOR A BATTERY, BATTERY AND MOTOR VEHICLE HAVING SAID BATTERY

(71) Applicants: Robert Bosch GmbH, Stuttgart (DE); Samsung SDI Co., Ltd., Yongin-si, Gyeonggi-do (KR)

(72) Inventors: Karsten Thoelmann, Moeglingen (DE); Stefan Butzmann, Beilstein (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 564 days.

(21) Appl. No.: 14/386,616

(22) PCT Filed: Feb. 18, 2013

(86) PCT No.: PCT/EP2013/053168
§ 371 (c)(1),
(2) Date: Sep. 19, 2014

(87) PCT Pub. No.: WO2013/143779
PCT Pub. Date: Oct. 3, 2013

(65) Prior Publication Data
US 2015/0064513 A1     Mar. 5, 2015

(30) Foreign Application Priority Data
Mar. 28, 2012    (DE) .................. 10 2012 204 958

(51) Int. Cl.
*H01M 10/48* (2006.01)
*H01M 10/42* (2006.01)
(Continued)

(52) U.S. Cl.
CPC ............ *H01M 10/482* (2013.01); *B60L 3/12* (2013.01); *B60L 11/1861* (2013.01);
(Continued)

(58) Field of Classification Search
CPC ........... B60L 11/1861; B60L 11/1864; H01M 10/4207; H01M 10/4257
See application file for complete search history.

(56) References Cited

U.S. PATENT DOCUMENTS

| | | |
|---|---|---|
| 6,442,494 B1 | 8/2002 | Baalu et al. |
| 2005/0057216 A1* | 3/2005 | Yamaguchi ........... H02J 7/0004 320/106 |

(Continued)

FOREIGN PATENT DOCUMENTS

| | | |
|---|---|---|
| CN | 1595704 A | 3/2005 |
| CN | 102340159 A | 2/2012 |

(Continued)

OTHER PUBLICATIONS

International Search Report corresponding to PCT Application No. PCT/EP2013/053168, dated May 16, 2013 (German English language document) (7 pages).

*Primary Examiner* — Sarah A Slifka
(74) *Attorney, Agent, or Firm* — Maginot, Moore & Beck LLP

(57) ABSTRACT

A battery comprises a plurality of battery modules, a plurality of monitoring units with a respective monitoring unit connected to a battery module, a battery control unit, and a first communication network to which the monitoring units are connected. The first communication network is configured to transmit data from or to the battery control unit. Furthermore, the battery comprises a second communication network configured to transmit an activation signal for activating a monitoring unit to a further monitoring unit.

6 Claims, 6 Drawing Sheets

(51) Int. Cl.
  *B60L 11/18*       (2006.01)
  *B60L 3/12*        (2006.01)
  *H01M 10/0525*     (2010.01)

(52) U.S. Cl.
  CPC ..... *B60L 11/1864* (2013.01); *H01M 10/4207*
      (2013.01); *H01M 10/4257* (2013.01); *B60L*
      *2240/545* (2013.01); *B60L 2240/547*
      (2013.01); *B60L 2240/549* (2013.01); *H01M*
      *10/0525* (2013.01); *H01M 2010/4271*
      (2013.01); *Y02E 60/122* (2013.01); *Y02T*
      *10/7011* (2013.01); *Y02T 10/7044* (2013.01);
      *Y02T 10/7061* (2013.01); *Y02T 90/16*
      (2013.01)

(56) References Cited

U.S. PATENT DOCUMENTS

| | | |
|---|---|---|
| 2007/0146151 A1 | 6/2007 | Yamashita et al. |
| 2011/0140533 A1* | 6/2011 | Zeng .................. B60L 11/1853<br>307/80 |

FOREIGN PATENT DOCUMENTS

| | | |
|---|---|---|
| DE | 10 2009 057 515 A1 | 2/2011 |
| EP | 0 798 839 A2 | 10/1997 |
| EP | 2 408 053 A2 | 1/2012 |
| GB | 2 405 990 A | 3/2005 |

\* cited by examiner

METHOD FOR ACTIVATING A PLURALITY OF MONITORING UNITS FOR A BATTERY, BATTERY AND MOTOR VEHICLE HAVING SAID BATTERY

This application is a 35 U.S.C. § 371 National Stage Application of PCT/EP2013/053168, filed on Feb. 18, 2013, which claims the benefit of priority to Serial No. DE 10 2012 204 958.4, filed on Mar. 28, 2012 in Germany, the disclosures of which are incorporated herein by reference in their entirety.

The present disclosure relates to a battery having a plurality of battery modules, a plurality of monitoring units, wherein a respective monitoring unit is connected to a battery module, a battery control unit and a first communication network, particularly a field bus, to which the monitoring units are connected and that is designed to transmit data from or to the battery control unit. In addition, the disclosure relates to a method for activating a plurality of monitoring units for a battery. Furthermore, the disclosure relates to a motor vehicle having the battery, which battery is connected to a drive system of the motor vehicle.

BACKGROUND

Lithium-ion batteries, e.g. for automotive applications, are known to comprise a multiplicity of battery cells. These battery cells are individually monitored, e.g. in respect of their voltage and temperature, on the basis of safety requirements. The monitoring is performed by monitoring units, also called cell supervising circuits. Conventional monitoring units communicate with a central controller frequently via the known CAN (controller area network) bus. Conventional monitoring units are usually of identical design in terms of software and hardware in order to be able to manufacture them inexpensively.

FIG. 1 shows a known battery 100 that comprises a plurality of battery modules 102 and respective monitoring units 104 connected thereto. The battery modules 102 each comprise a plurality of series-connected lithium-ion battery cells 106. The monitoring units 104 are connected to the battery modules 102 such that they are able to measure or monitor the voltage thereof. All the monitoring units 104 and a battery control unit 107 are connected to a CAN bus 108. The known monitoring units 104 are identical in terms of software and hardware. When the monitoring units 104 are switched on, they are therefore addressed by the battery control unit BCU via the CAN bus in a random order.

SUMMARY

The disclosure provides a battery that comprises a plurality of battery modules and a plurality of monitoring units. A respective monitoring unit is connected to a battery module. Furthermore, the battery according to the disclosure comprises a battery control unit and a first communication network, particularly a field bus, to which the monitoring units are connected. The first communication network is designed to transmit data from or to the battery control unit. Furthermore, the battery comprises a second communication network that is designed to transmit an activation signal for activating one monitoring unit to a further monitoring unit.

Furthermore, a motor vehicle comprises the battery according to the disclosure, wherein the battery is connected to a drive system of the motor vehicle.

The method according to the disclosure for activating a plurality of monitoring units for a battery, comprising a plurality of battery modules, wherein a respective monitoring unit is connected to a battery module, a battery control unit and a first communication network, particularly a field bus, to which the monitoring units are connected and that transmits data from or to the battery control unit, comprises the following steps in principle:

a) transmission of an activation signal from the battery control unit via a second communication network to a first monitoring unit,
b) activation of the first monitoring unit by the activation signal,
c) transmission of the activation signal from the activated monitoring unit via the second communication network to a further monitoring unit,
d) activation of the further monitoring unit,
e) repetition of steps c) and d) until a plurality of monitoring units are activated.

Conventional monitoring units, which essentially have identical software and hardware, can be activated sequentially, that is to say in succession, in the case of the battery according to the disclosure, particularly by the second communication network. In this case, the battery control unit can allocate a communication address to each activated monitoring unit, preferably via the first communication network. If the activation of the monitoring units takes place in a particular physical order, the monitoring units can be addressed in the same order, so that the battery control unit can draw conclusions about the physical arrangement of the monitoring unit, for example, from the addresses. By way of example, an advantage of the battery according to the disclosure is therefore that it is possible, in the case of any faulty battery module, for the battery control unit to use the address of the latter to specify where the faulty battery module is situated, so that it can be quickly found, repaired or replaced.

In contrast to conventional batteries, the second communication network can prevent random activation of the monitoring units and cater for an advantageous predetermined activation order for the monitoring units.

According to a further embodiment, the battery may comprise a plurality of switching elements, wherein a respective switching element can be connected to a monitoring unit and to the second communication network. The switching elements are preferably designed to activate or deactivate the monitoring units.

Furthermore, a monitoring unit can comprise a voltmeter, a temperature sensor, a microcontroller and a voltage regulator, for example. The voltage regulator can supply the microcontroller with suitable voltage from a battery module voltage. The voltmeter can measure the voltage of a battery module, and the temperature sensor can measure the battery module temperature. The microcontroller can record, store and/or compare these measured values and use the first communication network to transmit them to the battery control unit, for example.

Furthermore, the battery control unit can use the first communication network to request measured values from a particular monitoring unit, which involves the battery control unit addressing the respective monitoring unit preferably with a unique address, so that only the respective addressed monitoring unit responds to the request.

A switching element can preferably be actuated via the second communication network and connects the monitoring unit either to the battery module voltage or to the suitable voltage provided by the linear regulator or isolates the monitoring unit therefrom, that is to say that the switching element can activate or deactivate the monitoring units.

Switching elements, particularly semiconductor switching elements, are good and can easily be actuated by the second communication network.

According to a further embodiment, the switching elements may comprise optocouplers having an optical receiver and an associated optical transmitter in each case. The optical transmitter of an optocoupler may be connected to one monitoring unit and the optical receiver of the same optocoupler may be connected to a further monitoring unit.

The optocouplers advantageously allow the transmission of an activation signal between DC-isolated circuits, e.g. the circuit of a monitoring unit and the circuit of the second communication network.

By way of example, MOSFETs, relays and the like can also be used as a switching element.

According to a further embodiment, the second communication network may comprise a plurality of clock-controlled delay elements. Preferably, the clock-controlled delay element comprises a D-type flipflop, for example a clock-edge-controlled D-type flipflop or a clock-state-controlled D-type latch.

According to a further embodiment, the delay elements each essentially comprise at least one data input, a clock input and a data output, wherein the data output of a delay element may be connected to one of the switching elements and to the data input of a further delay element. Such delay elements essentially allow the storage of one bit, e.g. a "1" for an activation signal. Furthermore, a plurality of series-connected delay elements can form a shift register, in particular, that, by way of example, passes the activation signal applied to the data input to the data output when there is an active clock edge at the clock input and otherwise stores it. This advantageously allows a plurality of monitoring units to be activated or switched on in succession and at defined intervals of time, particularly in accordance with the clock signal.

According to a further embodiment, the battery according to the disclosure may comprise a battery management system. A battery management system may be in the form of an electronic controller and allow overall monitoring and regulation of the battery modules. The battery management system can undertake the function of a charge regulator, for example, in motor vehicles.

According to a further embodiment of the battery according to the disclosure, a first monitoring unit can be connected to the battery control unit via the second communication network. Preferably, the first monitoring unit can receive an activation signal from the battery control unit, be activated and then transmit the activation signal via the second communication network to further monitoring units. This means that the battery control unit does not need to actuate every single monitoring unit directly.

BRIEF DESCRIPTION OF THE DRAWINGS

Exemplary embodiments of the disclosure are explained in more detail with reference to the drawings and the description below. In the drawings.

DETAILED DESCRIPTION

Figure 1:
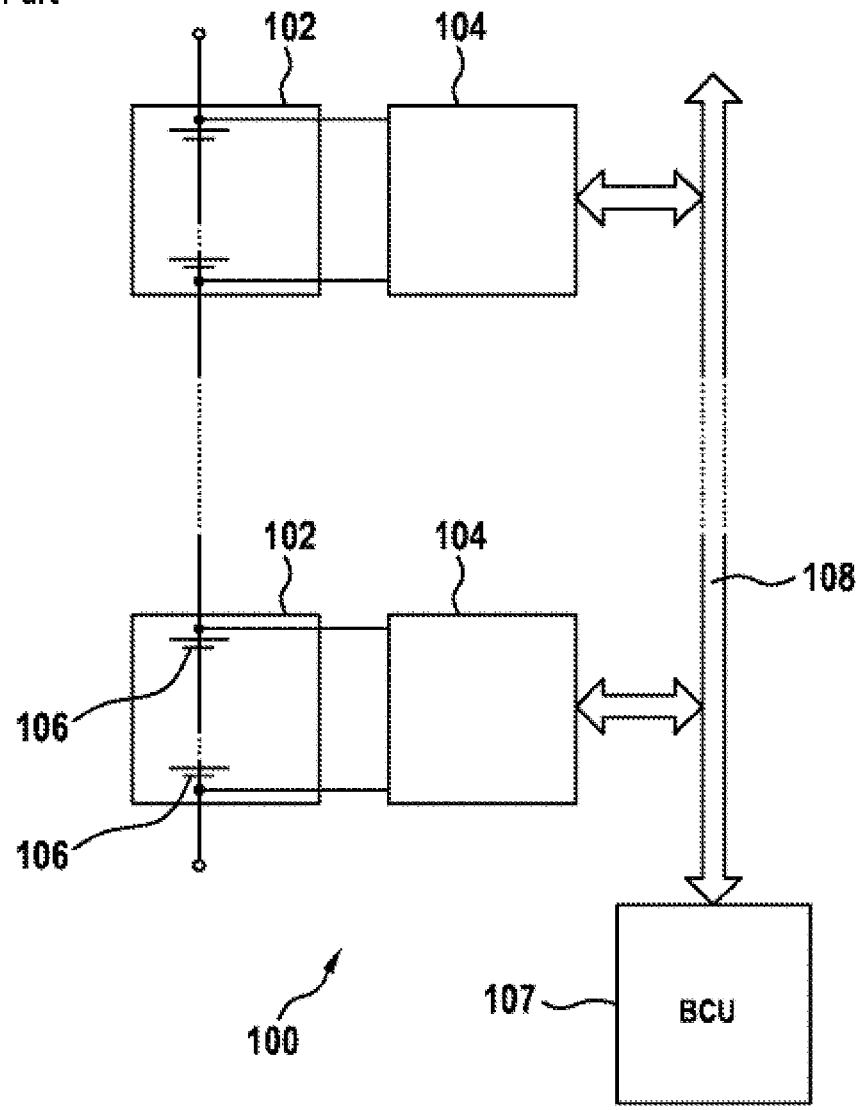
FIG. 1 shows a battery that is known from the prior art.
Figure 2:
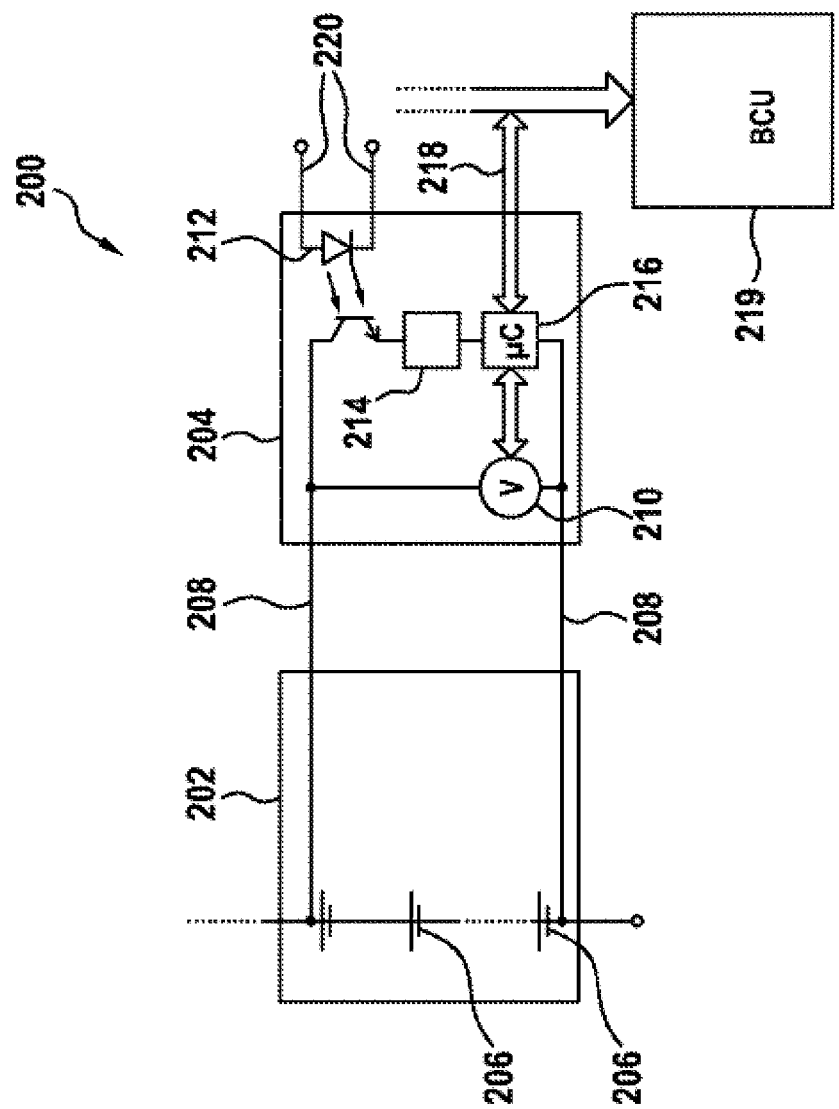
FIG. 2 shows a battery according to an exemplary embodiment of the disclosure.

FIG. 2 shows a battery 200 with a battery module 202 and a monitoring unit 204. The battery module 202 comprises a series circuit containing a plurality of lithium-ion battery cells 206. Two measurement and supply lines 208 tap off the voltage from the series circuit and connect the battery module 202 to the monitoring unit 204. The monitoring unit 204 comprises a voltmeter 210, an optocoupler 212, which forms a switching element, a linear regulator 214 and a microcontroller 216.

The voltmeter 210 is connected to the measurement and supply lines 208 and measures the voltage of the series circuit, that is to say the voltage of the battery module 202. Furthermore, the measurement and supply lines 208 supply the microcontroller 216 with power. The microcontroller 216 has the linear regulator 214 connected upstream of it in order to convert the voltage of the battery module 202 into a supply voltage that is suitable for the microcontroller 216. The microcontroller 216 can record, store and/or compare the measured voltages. Furthermore, the microcontroller 216 is connected to a battery control unit 219 via a CAN bus 218 that forms a first communication network. The microcontroller 216 transmits measured voltages or evaluations thereof to the battery control unit 219 via the CAN bus 218.

Besides the voltage of the battery module 202, the monitoring unit 204 can also measure, record, store, compare and transmit to the battery control unit 219 other measured values, e.g. the temperature of the battery module 202 or of individual lithium-ion battery cells 206.

In electric vehicles, a plurality of battery modules 202 with a plurality of monitoring units and a battery control unit 219 can form the battery 200.

If the measured voltage of an individual battery module 202, for example, falls below a particular threshold value or if the individual battery module 202 fails completely, that is to say is faulty, it is not possible for a battery control unit of a conventional battery to provide inferences as to the location of the faulty battery module 202.

However, the battery 200 according to an exemplary embodiment of the disclosure has the optocoupler 212 and a control line 220 connected thereto, which together form a second communication network. The battery control unit 219 uses the second communication network to activate all the battery modules 202 of the battery 200 in succession and in so doing assigns the currently activated battery modules 202 a respective unique communication address via the CAN bus 218. It is also possible for the battery modules 202 themselves, following activation, to provide a communication address. If the monitoring units 204 are connected to the second communication network in a particular physical order, it is possible for the communication addresses to be allocated in the same order. In the case of the faulty individual battery module 202, the battery control unit 219 indicates where said battery module can be found among the plurality of battery modules 202, so that it can quickly be repaired or replaced.

Figure 3:
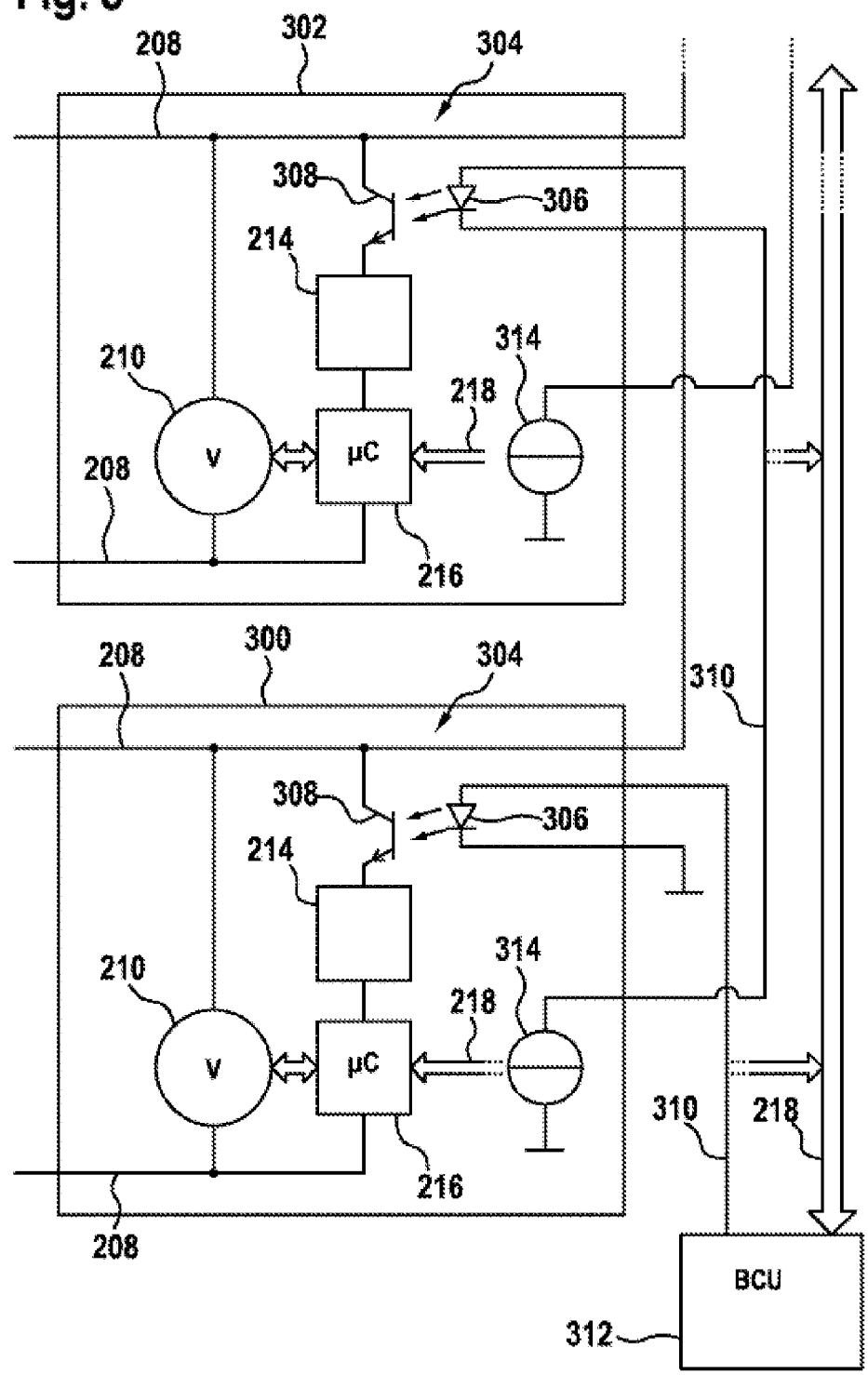
FIG. 3 shows monitoring units according to a further exemplary embodiment of the invention disclosure.

FIG. 3 shows a plurality of monitoring units 300, 302 in essentially identical form that essentially correspond to the monitoring unit 204 shown in FIG. 2. The monitoring unit 300 forms a first monitoring unit, and the monitoring unit 302 forms a further monitoring unit.

The monitoring units 300, 302 each comprise an optocoupler 304 that forms a switching element. Each optocoupler 304 comprises an optical transmitter 306, e.g. an infrared light-emitting diode, and an optical receiver 308, e.g. a phototransistor. The optical transmitter 306 of the first monitoring unit 300 is connected to a battery control unit 312 via a second communication network 310. The battery control unit 312 transmits an activation signal via the second communication network to the optical transmitter 306 of the first monitoring unit 300, so that said optical transmitter carries a current. The optical switch 306 thereby switches the optical receiver 308 such that the microcontroller 216 is supplied with power, and the first monitoring unit 300 is activated thereby and receives a first communication address via the CAN bus 218.

Furthermore, the monitoring units 300, 302 comprise a respective current source 314. The optical transmitter 306 of the further monitoring unit 302 is connected to the upper voltage potential of the first monitoring unit 300 and to the current source 314 of the first monitoring unit 300. If the first monitoring unit 300 is activated, current flows through the optical transmitter 306 of the further monitoring unit 302. The optical transmitter 306 thereby switches the optical receiver 308 such that the further monitoring unit is activated after the first monitoring unit. The further monitoring unit 302 receives a second communication address, which is different than the first communication address, via CAN bus 218.

As indicated in FIG. 3 by broken lines of the CAN bus 218 and the broken lines of the second communication network 310, further monitoring units may be connected and respectively activated and addressed in succession. Although the monitoring units 300, 302 have the same hardware and software, they can thus be addressed in a predetermined order, which means that the battery control unit 312 can infer the position, the situation and/or the physical arrangement of the individual monitoring units and battery modules from the communication address.

Figure 4:
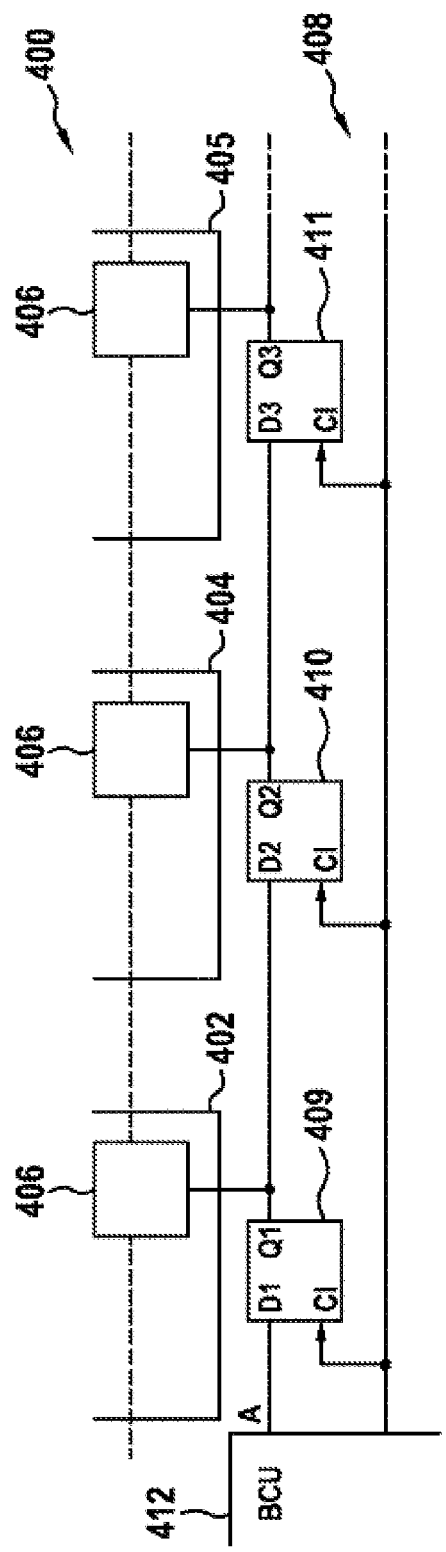
FIG. 4 shows a battery according to a further exemplary embodiment of the invention disclosure.

FIG. 4 shows a battery 400 having a plurality of monitoring units 402, 404, 405, wherein the monitoring unit 402 forms a first monitoring unit and the monitoring units 404, 405 form further monitoring units. The monitoring units 402, 404, 405 each have a switching element 406, e.g. an optocoupler as in FIG. 3. The switching elements 406 may be connected to one another in the manner of the optocouplers in FIG. 3. The switching elements 406 are connected to a second communication network 408. The second communication network 408 comprises a plurality of D-type flipflops 409, 410, 411. The D-type flipflop 409 forms a first delay element and the D-type flipflops 410, 411 form further delay elements.

The D-type flipflops 409, 410, 411 each have a data input D1, D2 or D3, a clock input C and a data output Q1, Q2 or Q3. The clock inputs C are connected to a battery control unit 412 that produces a clock signal.

The data input D1 of the first delay element or D-type flipflop 409 is connected to the battery control unit 412. The data output Q1 of the D-type flipflop 409 is connected to the switching element 406 of the first monitoring unit 402 and to the data input D2 of the further delay element or D-type flipflop 410. The data output Q2 of the further D-type flipflop 410 is connected to the switching element 406 of the further monitoring unit 404 and to the data input D3 of the further D-type flipflop 411. The data output Q3 of the further D-type flipflop 411 is connected to the switching element 406 of the further monitoring unit 405. In the same way, it is also possible for further monitoring units to be connected to yet further D-type flipflops and to the second communication network 408.

The manner of operation of the battery 400 shown in FIG. 4 and particularly of the second communication network 408 is described in more detail below with reference to the timing diagram shown in FIG. 5.

Figure 5:
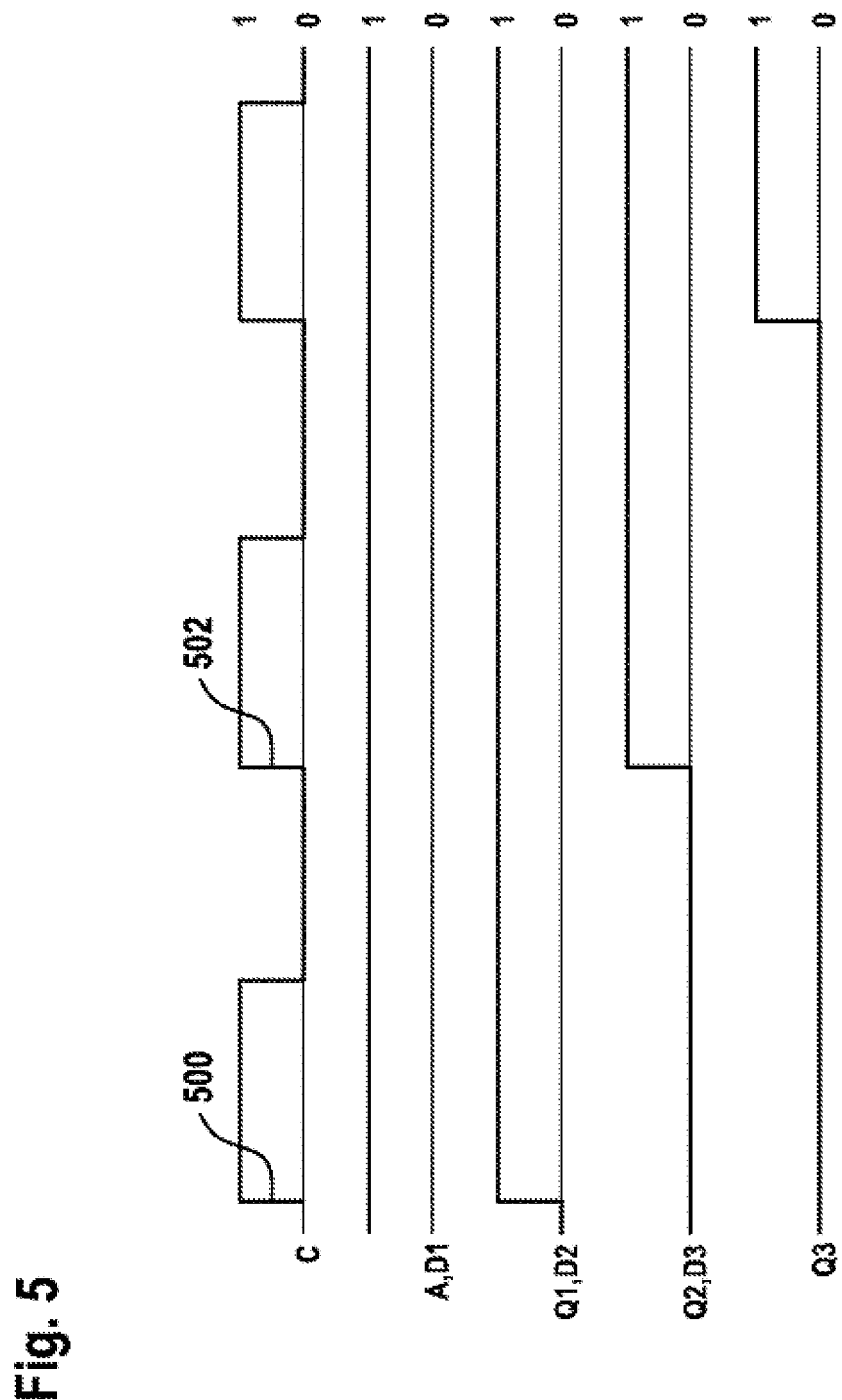
FIG. 5 shows a timing diagram for a second communication network according to a further exemplary embodiment of the disclosure.

FIG. 5 shows a plurality of signal profiles between the battery control unit 412 and the D-type flipflops 409, 410, 411. The battery control unit 412 outputs an alternating clock signal C to the clock inputs C1 of the D-type flipflops 409, 410, 411. By way of example, the D-type flipflops 409, 410, 411 are designed such that they provide the data output Q1, Q2, Q3 with a signal that is applied to the data input D1, D2, D3 in stable fashion when a positive clock edge is present.

In the timing diagram in FIG. 5, the battery control unit transmits an activation signal A to the data input D1 of the first D-type flipflop 409. In the case of a first positive clock edge 500 of the clock signal C, the D-type flipflop 409 outputs the activation signal A at the data output Q1 and uses the switching element 406 to activate the first monitoring unit 402. The activation signal A is now also applied to the data input D2 of the further D-type flipflop 410. In the case of a second positive clock edge 502 of the clock signal C, the further D-type flipflop outputs the activation signal A at the data output Q2 and uses the switching element 406 to activate the further monitoring unit 404. In the same way, it is also possible for further monitoring units to be respectively activated in succession by the second communication network. In this case, the clock-controlled D-type flipflops allow the activation at predetermined intervals of time.

Following every activation, the battery control unit 412 can uniquely address the monitoring units via a first communication network (not shown), for example.

Figure 6:
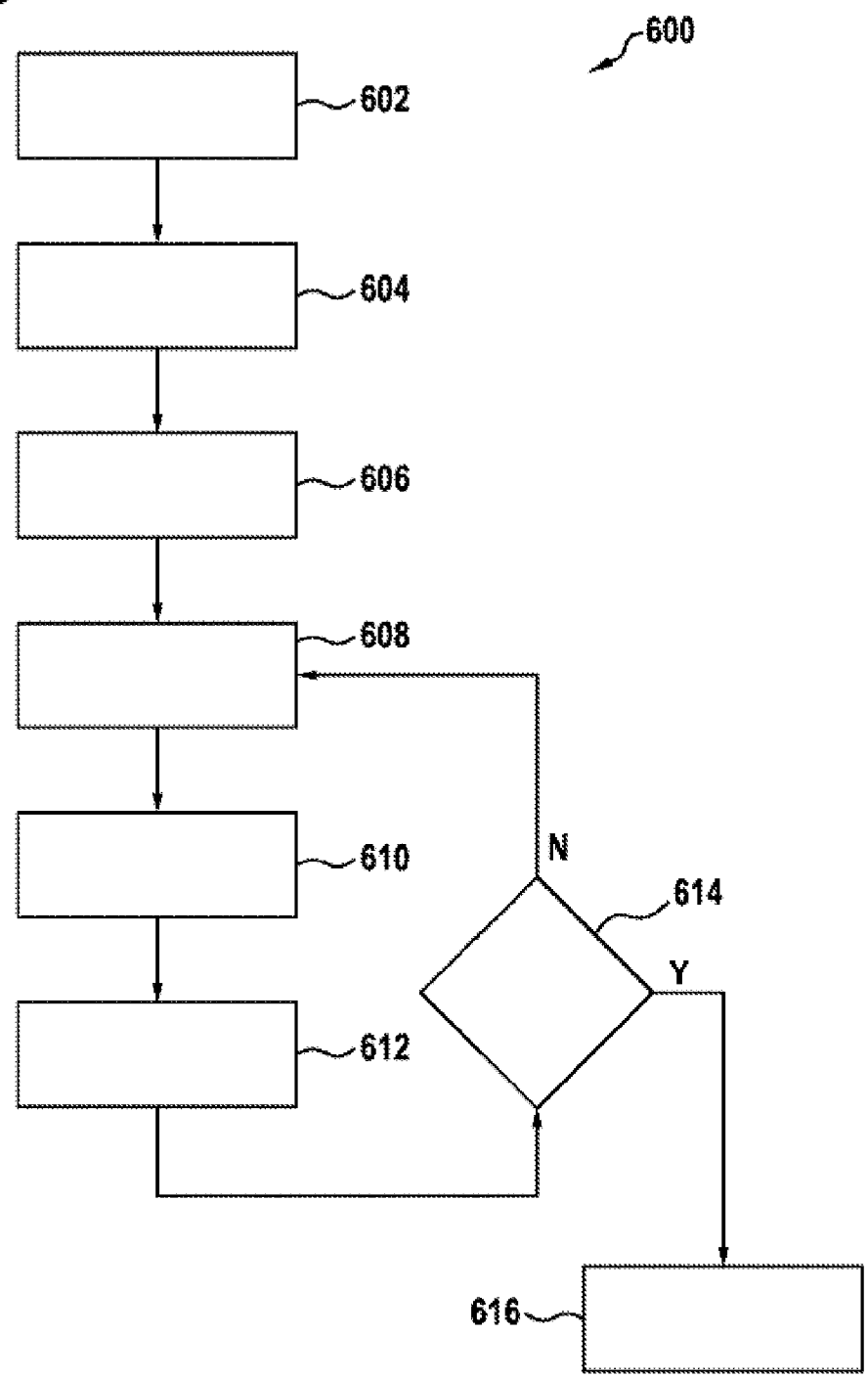
FIG. 6 shows a method according to an exemplary embodiment of the disclosure.

FIG. 6 shows a method 600 according to an exemplary embodiment of the disclosure. In a first step 602, an activation signal is transmitted from a battery control unit via a second communication network to a first monitoring unit. In a subsequent step 604, the first monitoring unit is activated by the activation signal. In a subsequent step 606, the activated first monitoring unit is addressed via a first communication network. In a subsequent step 608, the activation signal is transmitted from the activated monitoring unit to a further monitoring unit. In a subsequent step 610, the further monitoring unit is activated. In a subsequent step 612, the activated further monitoring unit is addressed via the first communication network.

Following step 612, a step 614 can be used to check whether all the monitoring units of a battery are activated and have an address, and if so Y, the method 600 ends in step 616, and if no N, the method 600 repeats steps 608, 610 and 612.

The invention claimed is:
1. A battery comprising:
a plurality of battery modules;
a plurality of monitoring units, each monitoring unit of the plurality of monitoring units being operably connected to a respective battery module of the plurality of battery modules and configured to at least measure a battery module voltage of the respective battery module;
a battery control unit;
a first communication network including a bus configured to connect each monitoring unit of the plurality of monitoring units to the battery control unit, the battery control unit being configured to communicate with the plurality of monitoring units via the first communication network; and a second communication network, which is separate from the first communication network, including a plurality of connections configured to connect the battery control unit with the plurality of monitoring units, the battery control unit being configured to transmit an activation signal to the plurality of monitoring units via the second communication network, wherein each monitoring unit of the plurality of monitoring units includes a switching element operably connected to the second communication network, the switching element being configured to activate the respective monitoring unit in response to the respective monitoring unit receiving the activation signal via the second communication network from one of (i) the battery control unit and (ii) a further monitoring unit of the plurality of monitoring units.

2. The battery as claimed in claim 1, wherein the plurality of connections of the second communication network configured to sequentially connect the battery control unit with the plurality of monitoring units in a daisy chain configuration.

3. The battery as claimed in claim 1, wherein:

the switching elements of each monitoring unit of the plurality of monitoring units comprise optocouplers each having an optical receiver and an associated optical transmitter, the optical receiver of each switching element being operably connected to activate the respective monitoring unit of the plurality of monitoring units, and the optical transmitter of each switching element being operably connected to receive the activation signal via the second communication network from one of (i) the battery control unit and (ii) a further monitoring unit of the plurality of monitoring units.

4. The battery as claimed in claim 1, wherein the second communication network comprises a plurality of clock-controlled delay elements, the battery control unit being configured to provide a clock signal to the plurality of clock-controlled delay elements to sequentially transmit the activation signal to the plurality of monitoring units.

5. The battery as claimed in claim 4, wherein:

the delay elements of the plurality of clock-controlled delay elements each have at least one data input, a clock input and a data output, the data output of each delay element of the plurality of clock-controlled delay elements is connected to a respective switching element of a respective monitoring unit of the plurality of monitoring unit, and the data input of a first delay element of the plurality of clock-controlled delay elements is connected to the battery control unit and configured to receive the activation signal from the battery control unit and the data output of the first delay element is connected to the data input of a second delay element of the plurality of clock-controlled delay elements.

6. The battery as claimed in claim 1, further comprising:

a battery management system.

* * * * *